(12) United States Patent
Bailey et al.

(10) Patent No.: US 6,612,094 B1
(45) Date of Patent: Sep. 2, 2003

(54) ARTICLE WRAPPING APPARATUS

(75) Inventors: Thomas William Bailey, Coventry (GB); John David Chandler, Coventry (GB); Andrew John Cleall, Coventry (GB); Brian Hill, Coventry (GB); Robert Howard Taylor, Coventry (GB)

(73) Assignee: Molins PLC, Milton Keynes (GB)

( * ) Notice: Subject to any disclaimer, the term of this patent is extended or adjusted under 35 U.S.C. 154(b) by 0 days.

(21) Appl. No.: 09/446,019

(22) PCT Filed: Jun. 19, 1998

(86) PCT No.: PCT/GB98/01789

§ 371 (c)(1),
(2), (4) Date: Dec. 16, 1999

(87) PCT Pub. No.: WO98/57852

PCT Pub. Date: Dec. 23, 1998

(30) Foreign Application Priority Data

Jun. 19, 1997 (GB) .............................................. 9713012

(51) Int. Cl.⁷ ............................................... B65B 11/28
(52) U.S. Cl. ........................................... 53/234; 53/563
(58) Field of Search .......................... 53/466, 228, 234, 53/563, 444

(56) References Cited

U.S. PATENT DOCUMENTS

| | | | |
|---|---|---|---|
| 3,579,952 A | | 5/1971 | Davies et al. |
| 3,813,849 A | * | 6/1974 | Stambera et al. |
| 3,922,837 A | * | 12/1975 | David |
| 4,612,756 A | * | 9/1986 | Focke et al. |
| 5,003,755 A | * | 4/1991 | Draghetti |
| 5,129,209 A | * | 7/1992 | Focke |
| 5,301,489 A | * | 4/1994 | Benedetti |
| 5,392,586 A | | 2/1995 | Imai |
| 5,544,467 A | * | 8/1996 | Focke |
| 5,771,666 A | * | 6/1998 | Bertuzzi et al. |
| 5,996,309 A | * | 12/1999 | Focke et al. |
| 5,996,310 A | * | 12/1999 | Bailey et al. |
| 5,996,318 A | * | 12/1999 | Draghetti |
| 6,186,313 B1 | * | 2/2001 | Spatafora et al. |

FOREIGN PATENT DOCUMENTS

GB 39 15 888 1/1990

* cited by examiner

Primary Examiner—Eugene Kim
(74) Attorney, Agent, or Firm—Antonelli, Terry, Stout & Kraus, LLP

(57) ABSTRACT

Article wrapping apparatus for wrapping or folding a wrapper blank around an article which may comprise or contain a group of rod-like articles such as cigarettes, includes a wrapper blank former which simultaneously folds sides and ends of a blank (60) by plunging the former (64) around an article holder (58) and subsequently plunging the article from the holder into the former. The apparatus also includes a housing (24) for supporting a partially-wrapped article which is pivoted relative to an abutment (32) so that a flap is swept into a closed position; and pivoted holders (24, 54) which are used to transfer articles between axially-spaced process positions on a process drum (6). Folding operations may be performed during transfer to or from a pivotable holder (24, 54), particularly in a radial direction of the drum (6).

10 Claims, 10 Drawing Sheets

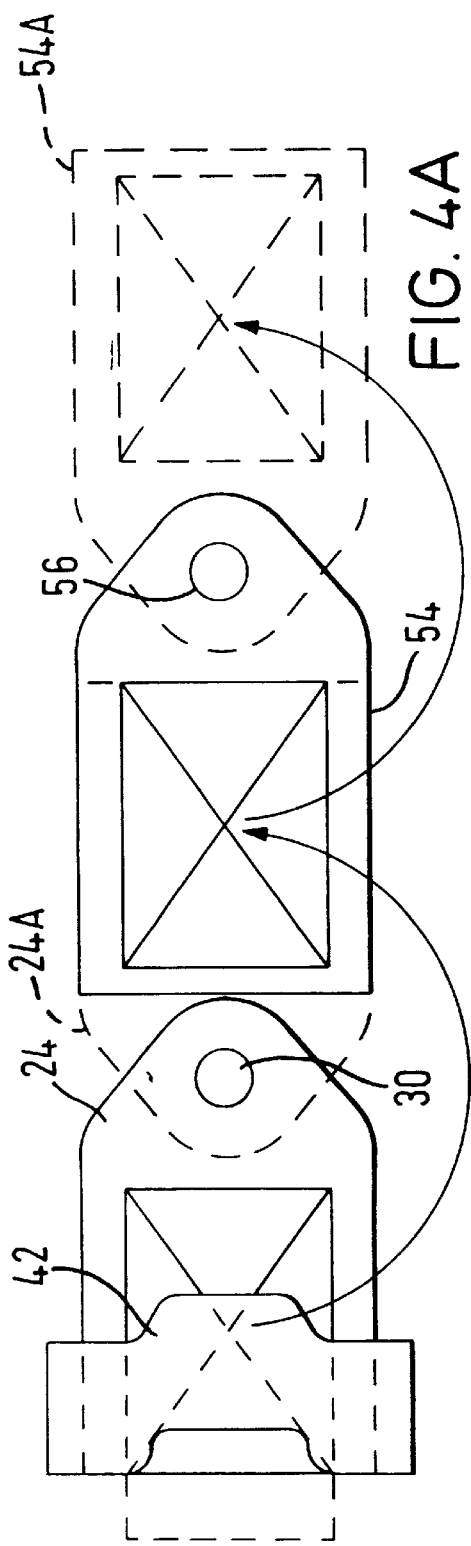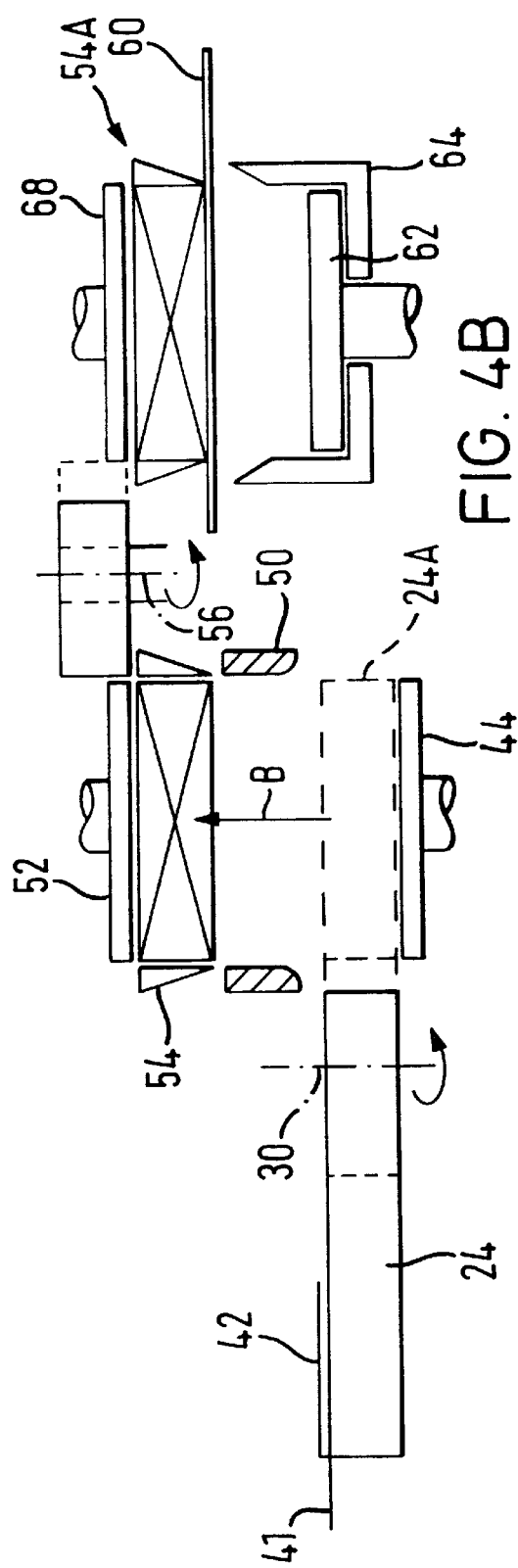

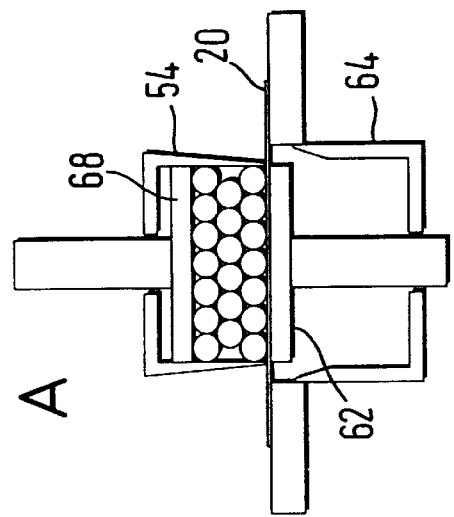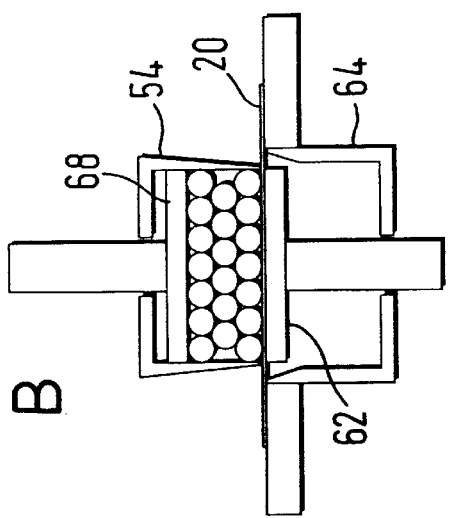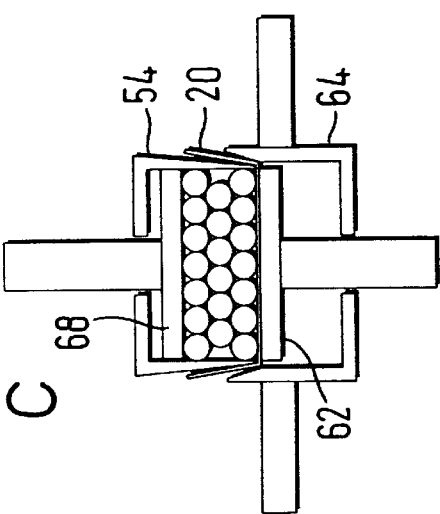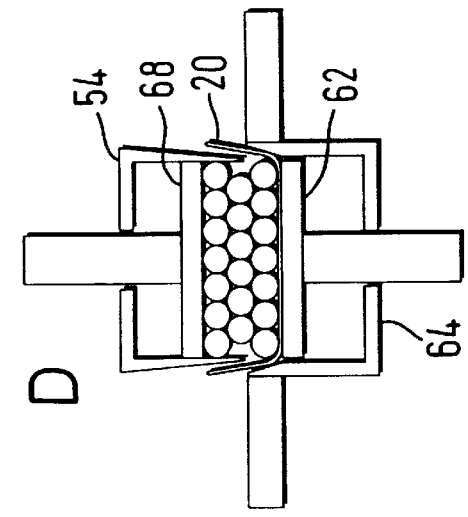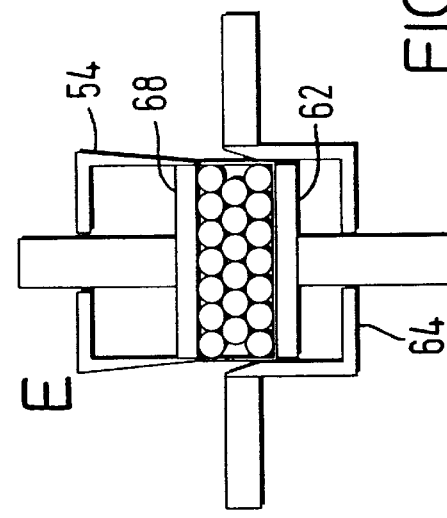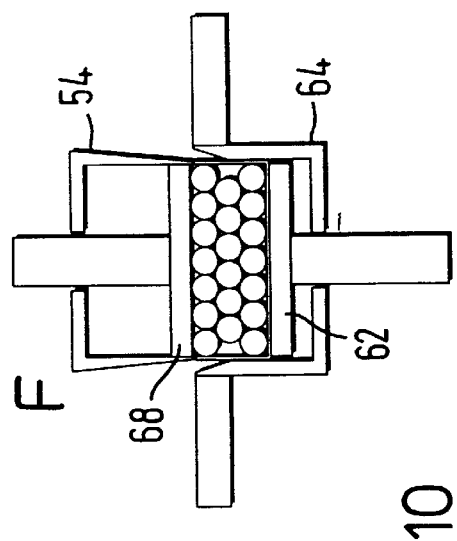
FIG. 10

ARTICLE WRAPPING APPARATUS

This invention relates to article wrapping apparatus, particularly for wrapping or folding a wrapper blank around an article which may comprise or contain a group of rod-like articles such as cigarettes. The article to be wrapped may typically be parallelepipedal in shape. The product of the wrapping apparatus may be a fully or partially wrapped package containing the article. The article may comprise a group of articles.

Cigarettes are commonly packaged in groups which are first wrapped in wrapping material and then enclosed in cardboard packages, such as the well-known hinged lid packs. Large numbers of such packages are commonly formed in modern factories, and the machinery for producing such packages must therefore have the capability of working reliably at high speeds.

According to a first aspect, the present invention provides article wrapping apparatus in which a blank is formed around an article, particularly for folding a wrapper portion protruding from a partially wrapped article, comprising a holder which is adapted to support the article on at least two opposite sides, so that a wrapper portion protrudes from at least one end of the holder lying in a plane, the holder being pivotally mounted about an axis which is parallel to said plane, and at least one abutment means, whereby pivoting of the holder towards the abutment means causes said wrapper portion to be swept into a closed position adjacent an end of the article in said holder.

In one embodiment of the invention, the holder consists of a housing comprising a generally U-shaped body which encloses two sides and one end of the article, the pivot point being positioned in the region of the said one end and a single abutment member being provided adjacent the opposite end.

In a preferred embodiment, a plurality of such closure devices are spaced around the periphery of a rotary drum, and are arranged to receive an article comprising a wrapped group of cigarettes from a coaxially mounted delivery device. For example, this may be a plunger mechanism of the type shown at the output side of the rotary apparatus described in our International application no. PCT GB97/03398.

Preferably, the pivoting movement of the housing is so arranged that the article can be swivelled through 180°, to a second, axially displaced position on the drum to enable a further folding process to be carried out, for example by means of a plunger mechanism which transports the article outwardly in a radial direction relative to the drum, i.e. parallel to the pivot axis. Preferably, before the article is moved to the second position, an inner packaging member, which may comprise an inner frame if the article is a group of cigarettes to be packaged in a hinged lid pack, is placed on top of the article, and is held in position, during the radial movement of the article, by means of a counter plunger positioned radially outwardly of the second position.

Preferably, the arrangement is such that the outward movement of the plunger mechanism then causes the sides of the inner frame to be folded down, by engagement with a static inner frame former and the wrapped bundle is then received in a further pivotable holder, which is arranged to surround the package on all four sides, and is also pivotally movable so as to enable the wrapped bundle to be transferred to a further axially displaced position on the drum.

Preferably, the inner frame former is also arranged to engage with the remaining protruding flap of the wrapper, so as to close that at the same time as the inner frame is folded down.

Preferably, the further axially displaced position to which the article is transferred comprises a packet forming station, at which a cardboard blank is folded around the article, by means of a further plunging action.

Preferably, the packet forming station comprises a further plunger/counter plunger arrangement, whereby a packet blank is positioned above a forming pocket containing an upwardly movable plunger, and the article is positioned on the blank, with a counter-plunger being positioned above the bundle. The four sides of the package are then folded around the article, by a sequence of movements of the plungers and the lower former, as follows:

(a) bringing the upper counter plunger down to contact the top surface of the article;

(b) bringing the forming pocket upwards so that its edges engage the underside of the blank at the position of the folds which are to be formed;

(c) raising the forming pocket so as to fold the sides of the blank around the edges of the housing;

(d) lowering the supporting plunger, the counter plunger, and the forming pocket until the package is released from the upper housing.

Another aspect of the invention extends to article wrapping apparatus in which a blank is formed around an article, comprising an article holder having at least one open side, and a former which forms a cooperating pocket facing said open side into which the holder can be received, and means for bringing the holder and former pocket together, whereby, in use, an article is positioned in the holder and a blank is positioned between the holder and the former pocket, so that when the holder and the former pocket are brought together, the blank is folded by cooperation of adjacent edges of the holder and former pocket. Thus the sides and ends of the blank may be simultaneously folded by cooperation of adjacent holder and pocket edges. Preferably, the holder and the pocket are both provided with plungers for engaging the article and the blank respectively, so that after the initial folding movement, the holder plunger can be extended towards the pocket, while the pocket plunger simultaneously retracts, so as to move the article from the holder into the pocket.

Preferably, the package is then moved to successive further positions, to enable the remainder of the package to be closed around the bundle.

A preferred embodiment of the invention therefore provides an article wrapping apparatus, comprising a plurality of package forming stations spaced around the periphery of a rotary drum, each comprising a first position comprising a pivotally mounted holder for a partially wrapped article, whose movement is arranged to cause inward folding of two protruding corners and one flap at the trailing end of the wrapper; a second, axially displaced position, at which a remaining flap of the wrapper is closed, and an inner frame is folded around the sides, by means of a radial plunging movement; and a third, further axially disposed position, at which a cardboard blank is wrapped around the sides of the package, by means of a further radial plunging movement. Preferably, the package is moved between the successive positions, by rotating holder at each of the first and second positions, through 180°, about parallel axes which extend radially of the drum, the plane of rotation of the second holder being radially displaced, relative to that of the first holder, with a radially movable plunger mechanism arranged to transfer the bundle from the first holder to the second holder whilst they are in radially superimposed positions.

According to a further aspect of the invention there is provided article wrapping apparatus in which a blank is formed around an article, comprising a transfer mechanism for articles which are to be processed at different axial positions on the periphery of a rotatable drum, comprising at least one holder which is pivotally mounted on an axis which extends radially of the drum, the holder being arranged to receive an article in a first position, and being pivotable about said axis to a second, axially displaced position.

Preferably, in the axially displaced position, a radially movable transport mechanism is also provided so that the article can then be transferred in a direction radial to the drum, for example into a further pivotally mounted holder having an opening which faces in a radial direction, and which is radially aligned with a corresponding opening in the first holder in the transfer position, so that the further holder can then be pivoted to a second position so as to transfer the article to a further axially displaced processing station.

A further aspect of the invention provides article wrapping apparatus in which a blank is formed around an article, comprising a holder which is pivotally mounted to enable an article to be transferred between different process stations, at least one of the process stations further comprising means for carrying out an operation to fold a blank around the article during transfer of the article to or from the holder. For example the folding operations may be carried out by moving the article into or out of the holder in a direction parallel to the pivot axis, so that flaps extending from the article are folded by cooperation with the holder itself, or with adjacent abutment means, during the movement.

The various aspects of the invention may be combined in any combination or sub-combination in common apparatus.

Some embodiments of the invention will now be described by way of example only, with reference to the accompanying diagrammatic drawings, in which:

FIG. 4A is a schematic plan view of parts of an assembly drum of the FIG. 1 system illustrating a sequence of wrapping/packaging operations;

FIG. 4B is an elevation of the parts shown in FIG. 4A;

FIGS. 10A to 10F illustrate stages of movement of the parts required to produce the folds indicated in FIGS. 6, 8 and 9;

Figure 1:
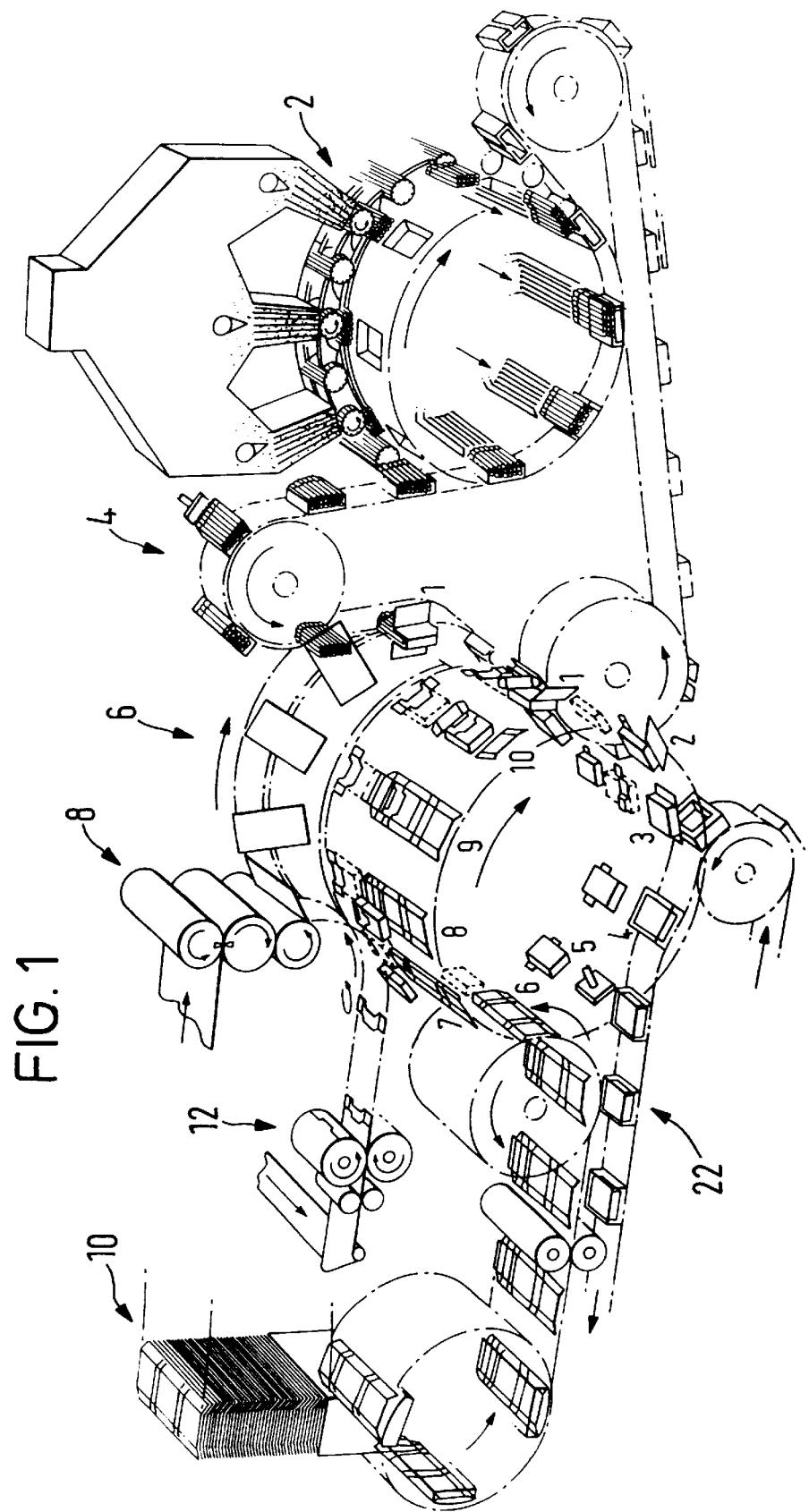
FIG. 1 is a schematic perspective view of a cigarette packaging system.

Referring to the drawings, FIG. 1 illustrates an overall view of a packing system in which groups of cigarettes are firstly formed in a hopper system illustrated generally at 2, which may for example be of the kind described in International patent specification no. WO 98/22349. These are transported in pockets on a conveyor 4, to join the packaging materials at a central assembly drum 6 as described in more detail below.

At the left hand side of the drawing there is illustrated a wrapper or foil feed system 8 which supplies foils to a foil assembly drum of the kind illustrated in said application no. PCT GB97/03398, which is mounted coaxially with the assembly drum 6, a blank feed apparatus 10 of the kind shown for example in International application no. PCT GB98/00932, and an inner frame feed system 12. As will be clear from the drawing, the various different components required to make up the final package are fed to the assembly drum 6 at different axially displaced positions, and thus, as the drum is rotated, preferably continuously, the cigarette group and foil can be moved axially along its surface, to discrete positions at which it is successively assembled with the required components.

Figure 2:
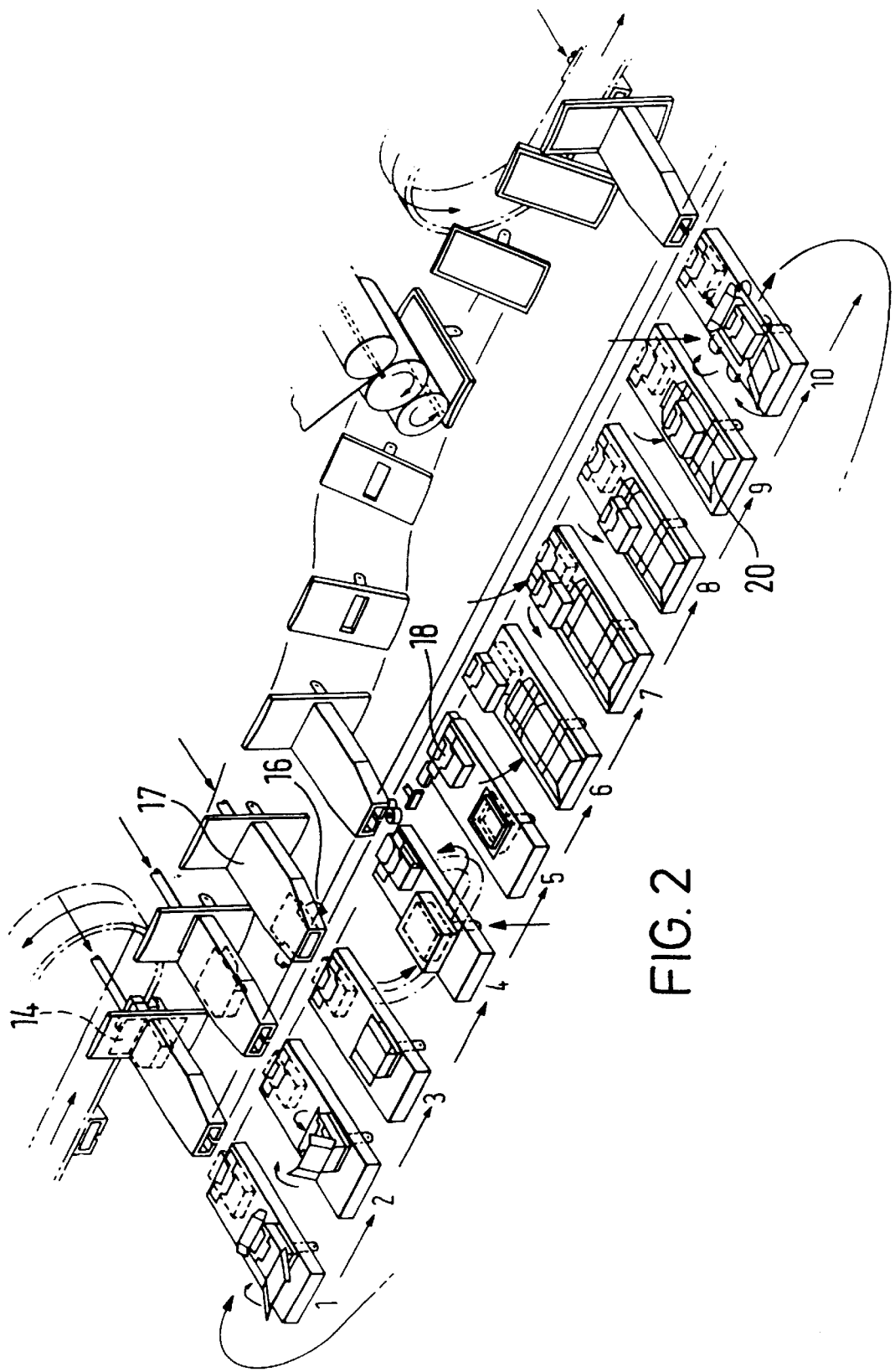
FIG. 2 is a schematic illustration of the material flow sequence employed in the system of FIG. 1.

FIG. 2 illustrates in more detail, the various stages of the wrapping process on the assembly drum, by means of a developed view in which the different station positions on the drum are numbered, corresponding to those in FIG. 1. Thus it will be seen that starting at the left hand side of the drawing, position 1 corresponds to the beginning of the plunging of the cigarette group into the foil 14, as described in said application no. PCT GB97/03398. The cigarette group with foil partially or fully wrapped around it is hereinafter referred to as the "bundle". By the time the apparatus has rotated to position 3 in FIG. 2, the side flaps of the bundle being folded down into position, as indicated by arrows 16, and at position 4, the bundle has exited from the foil former 17 and has entered the first of three axially spaced forming positions on the assembly drum 6 to allow successive wrapping and packing operations to be carried out.

The positions are indicated only diagrammatically in FIG. 2, but in general terms, the sequence of operations is as follows: the trailing ends of the foil are closed at stations 4 and 5, and the bundle receives an inner frame 18 on top. At station 6, the inner frame is folded around the sides of the bundle, and at stations 7 to 9, the bundle moves further in the axial direction until it reaches the position at station 10 where a blank 20 begins to be folded around it to form the final package. The folding process continues as the package proceeds on to station 1, and is finally completed by station 4, at which the complete package leaves the drum on an exit conveyor as indicated at 22 in FIG. 1.

The different axial forming positions on the drum, and the movements of the package between them, are illustrated in more detail in FIGS. 3 to 6. It will be appreciated that FIGS. 1 and 2 are schematic and omit details shown in subsequent figures. As illustrated in FIG. 3A, the semi-wrapped bundle, which leaves the former 17 after folding of the side flaps as indicated at 16 in FIG. 2, enters a generally U-shaped holder 24, with its trailing end 26 protruding from the open end of the holder. As can be seen from the figures, the leading end of the holder 24 in the axial direction 6A of the drum 6, is pivoted at 30 to the surface of the drum, and an abutment 32 is fixed to the drum behind the open end of the holder 24, as considered in the direction of drum rotation (indicated by the arrow A in FIG. 3B). The abutment 32 has a curved inner face 34 whose profile corresponds to the path swept out by the adjacent corner 36 of the holder, when the holder 24 is rotated in a clockwise direction as seen in the drawings, so as to tuck in the adjacent trailing side 26A of the end 26 of the bundle wrapper toil. The holder 24 is then rotated back to the axially oriented position (shown in full lines in FIG. 3B).

Figure 3A:
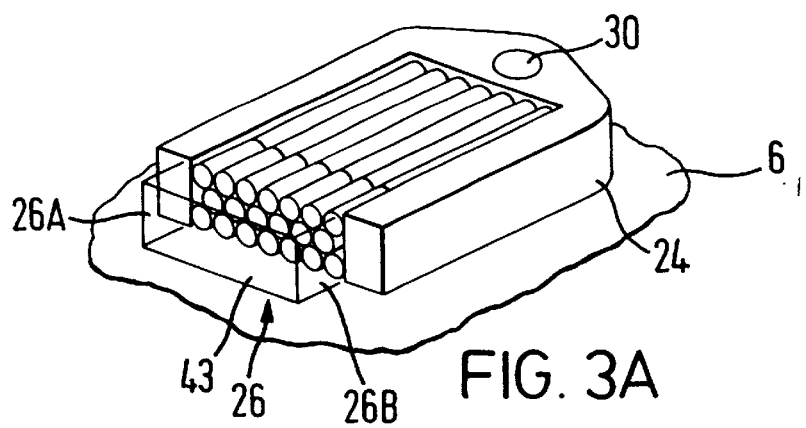
FIG. 3A is a perspective view of a first wrapper forming station in the system of FIG. 1.
Figure 3B:
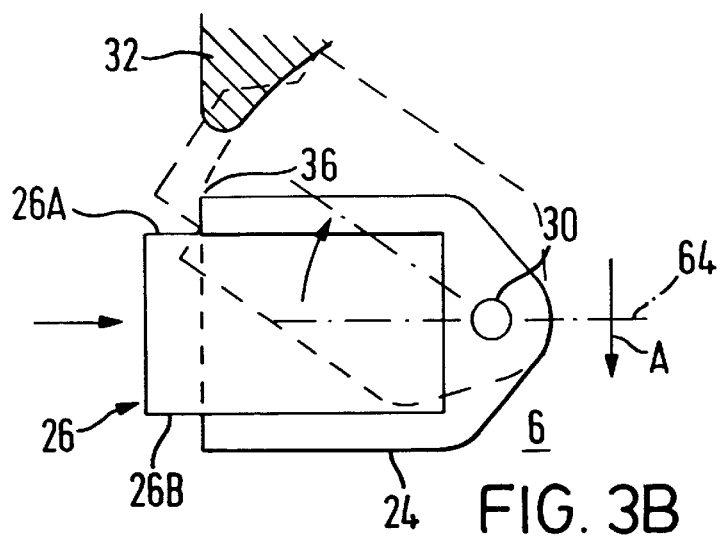
FIGS. 3B and 3C are plan views of the wrapper forming station of FIG. 3A, illustrating different operations.
Figure 3C:
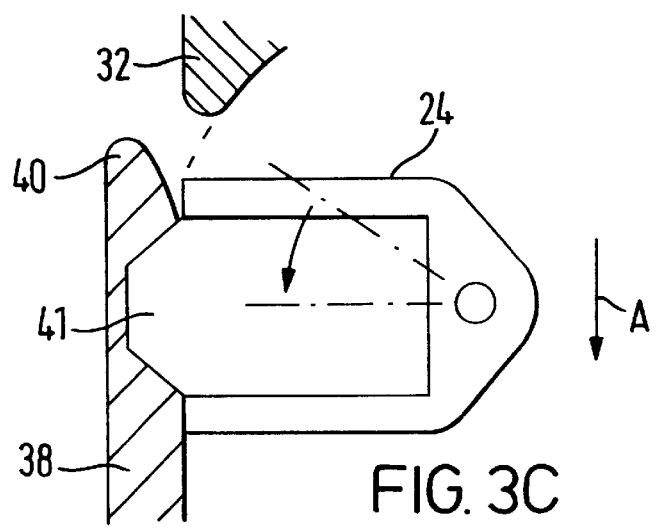
Figure 5:
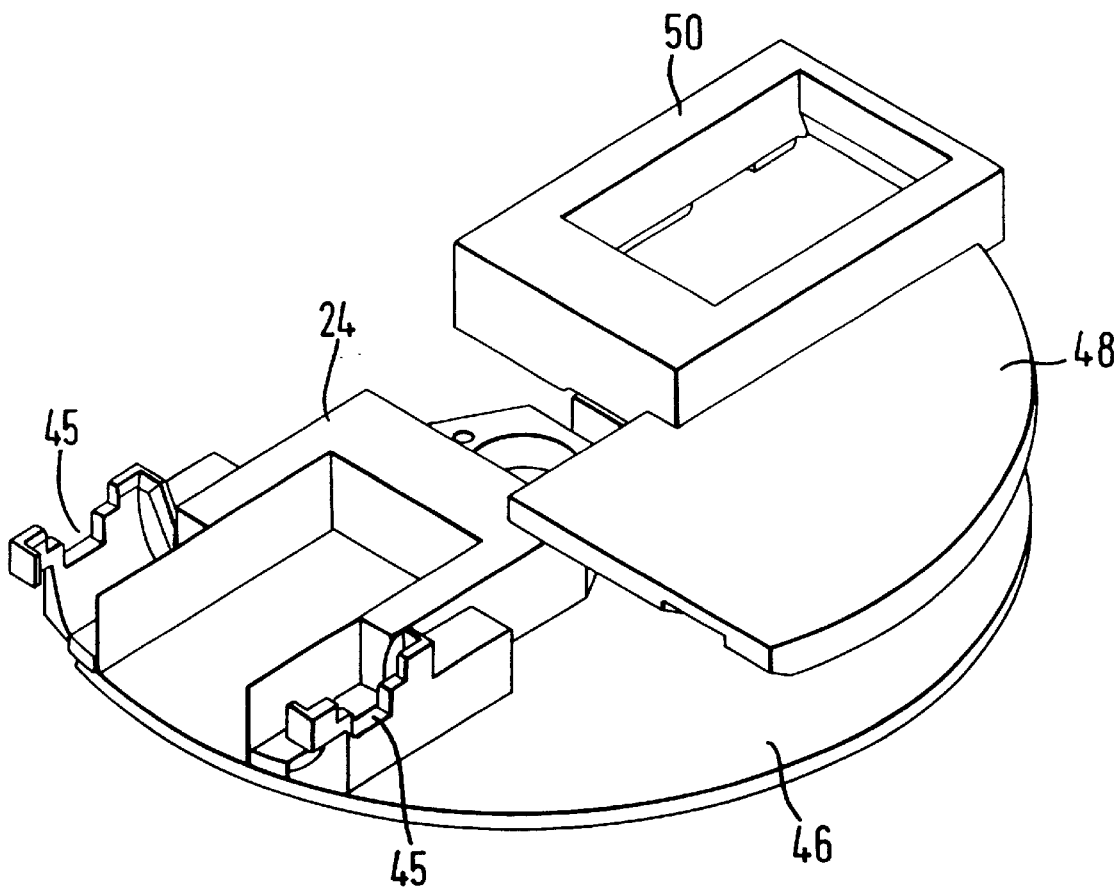
FIG. 5 is a perspective view of a device embodying the parts of FIG. 4.

The arrangement for tucking in the leading side 26B of the trailing end 26 is illustrated in FIG. 3C. A fixed abutment 38, which does not rotate with the drum 6, is located adjacent to the drum so that its nose 40 engages the leading side 26B of the wrapper, as the drum and holder 24 rotate past it. A shaped recess in the abutment 38 or a downstream abutment providing a conventional plough folder then engages with the lower protruding flap 43 (see FIG. 3A) so as to plough it into the closed position. In this way, both the leading and trailing sides, and the lower flap 43 of the trailing end 26, are tucked in.

Subsequent to this an inner frame 42 is located on top of the bundle, as illustrated in FIG. 4A, and the holder 24 is rotated through 180° to a second forming position indicated at 24A in FIGS. 4A and 4B, where the holder is positioned over a plunger 44. The arrangement is illustrated in more detail in FIG. 5, which also shows support members 45 on each side of the holder 24, which hold the inner frame 42 in its initial position. In order to prevent the foil from becoming loosened during the rotation of the holder 44, support plates 46 and 48 are also arranged above and below the path of rotational movement of the holder 24, and a rectangular frame former 50 is positioned above the plunger 44 so that when the plunger 44 is moved radially outwards (relative to drum 6), in the direction of arrow B in FIG. 4b, the upward movement of the bundle folds the sides of the inner frame down, and at the same time, closes the upper protruding flap 41 (FIG. 3C) at the end of the bundle.

During the upward movement of the plunger 44, a counter plunger 52 is held in engagement with the top of the bundle, so as to avoid buckling or other undesired upward movement of the top of the bundle and the inner frame. At the top of the stroke of the plunger 44, beyond the former 50, the bundle is received in a further rectangular holder 54, which encloses it on all four sides. As will be clear from the drawing, the lowermost edges of the holder 54 are formed in a sharp configuration, which assists in subsequent forming operations. The holder 54 is pivotally mounted on the drum 6, about an axis 56 which is parallel to the axis 30 of the first holder 24, so that the bundle can then be transferred to a further operating position indicated at 54A at the right hand side of FIG. 4, for enclosure in a cardboard blank 20, as explained in more detail below.

Figure 6:
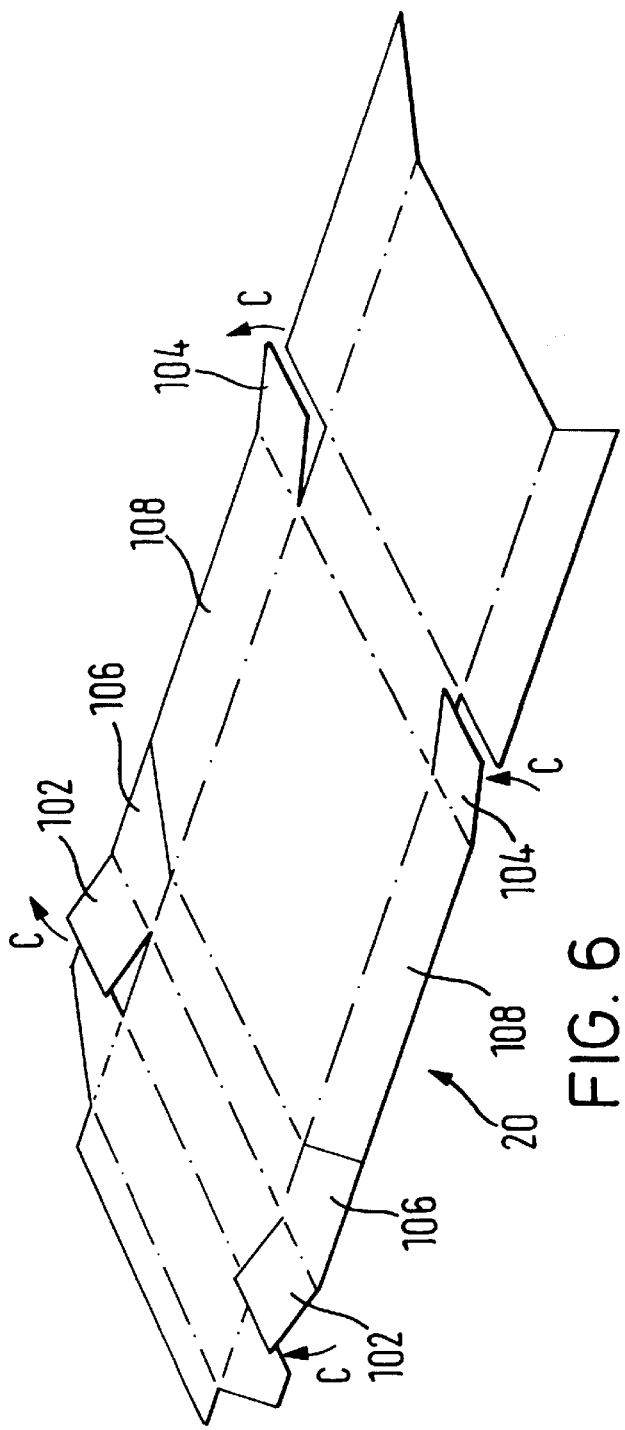
FIG. 6 is a perspective view of a blank for forming a pack around a bundle in the system of FIG. 1.
Figure 7:
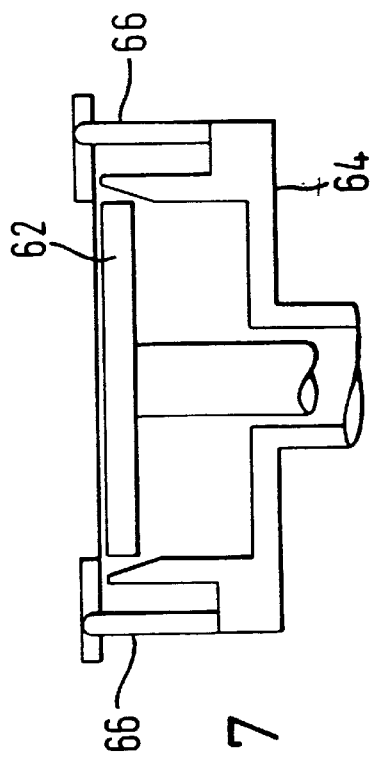
FIG. 7 is a schematic elevational view of a plunger device for making initial folds in the blank of FIG. 6.

As will be clear from consideration of FIGS. 1 and 2 above, a blank 20 for forming the cardboard packet has previously been positioned on the drum 6, below the holder in position 54A. The blank 20 is shown in more detail in FIG. 6, and lies flat when originally delivered to the drum 6. A further counter-plunger 62 is positioned below the bundle position 54A, in a packet forming housing 64, which is illustrated in more detail in FIG. 7. When the blank 20 of FIG. 6 is folded around the bundle, it is first necessary to displace the lid tuck-in flaps 102 and bottom tuck-in flaps 104, which will ultimately form the extreme corners of the pack, so that they will not be caught by other parts of the blank as those other parts are moved out of the original plane of the blank. This initial movement is illustrated by the arrows C in FIG. 6, and is achieved by means of four suitably positioned lifter pins 66 on the packet forming housing 64.

The various further operations required to complete the packet, are achieved by cooperation of a plunger 68 with the packet forming housing 64, and with the counter-plunger 62. The sequence of movements of the plungers 62 and 68 and the housing 64 are illustrated in FIGS. 10A to 10F and are described below with reference to stages A to F.

(A) Plunger 62 is brought into engagement with the underside of blank 20 lying immediately below the bundle in holder 54 (in position 54A of FIG. 4).

(B) The packet forming housing 64 is raised to engage the underside of the blank 20. The upper edges of the former 64 and lower edges of the housing 54, are both quite sharp, so as to facilitate the forming of proper folds.

Figure 8:
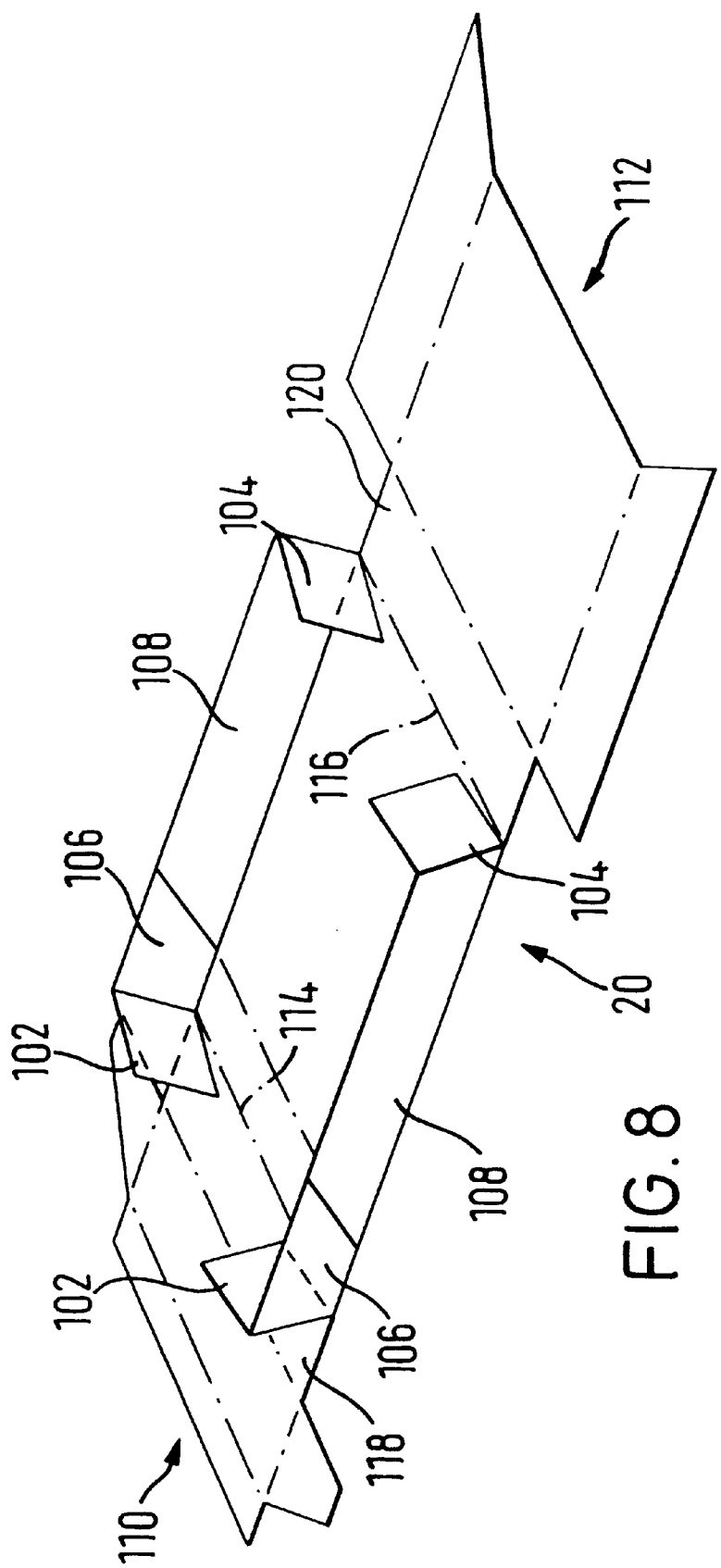
FIGS. 8 and 9 illustrate successive stages in the folding of the blank of FIG. 6.

(C) Housing 64 is raised so that its edges pass through the initial plane of the blank 20, so that the sides and ends of the blank begin to be folded upwards. As will be seen from FIG. 8, is necessary to raise the sides 106, 108 of the blank, slightly in advance of the lid end 110 and front panel end 112 (which are folded respectively about lines 114,116), and for this reason the side edges of the packet forming housing 64 are slightly proud, i.e. extend upwards slightly more, relative to the end edges. For purposes of illustration the extent to which the sides are raised in advance of the ends is exaggerated in FIG. 8, so that the sides and ends may still be regarded as being folded substantially simultaneously and in the same process operation.

(D) Housing 64, plunger 68, and counter-plunger 62 are lowered together, until housing 64 returns to the position at which its edges are level with the original plane of the blank 20, so that the bundle begins to be released from the housing 54.

Figure 9:
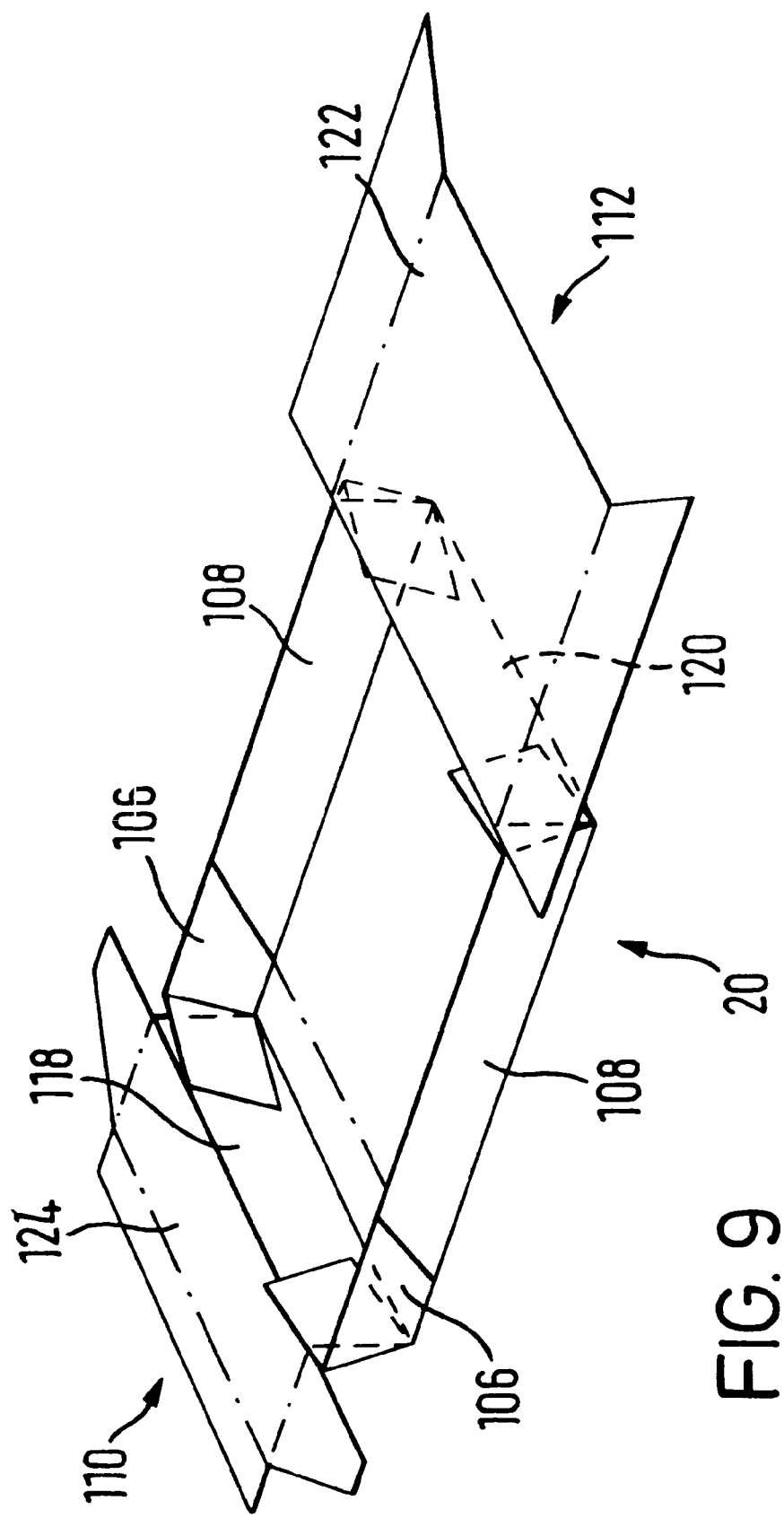

(E) Housing 64 remains stationary, whilst plungers 62 and 68 continue to move downwardly, so that cooperation of the side panels 106, 108 and end panels 118, 120 with the corresponding internal surfaces of housing 64 causes them to be brought into an upright position, as indicated in FIG. 9.

(F) The movement continues, until the bundle is completely contained in the packet forming housing 64.

Figure 11:
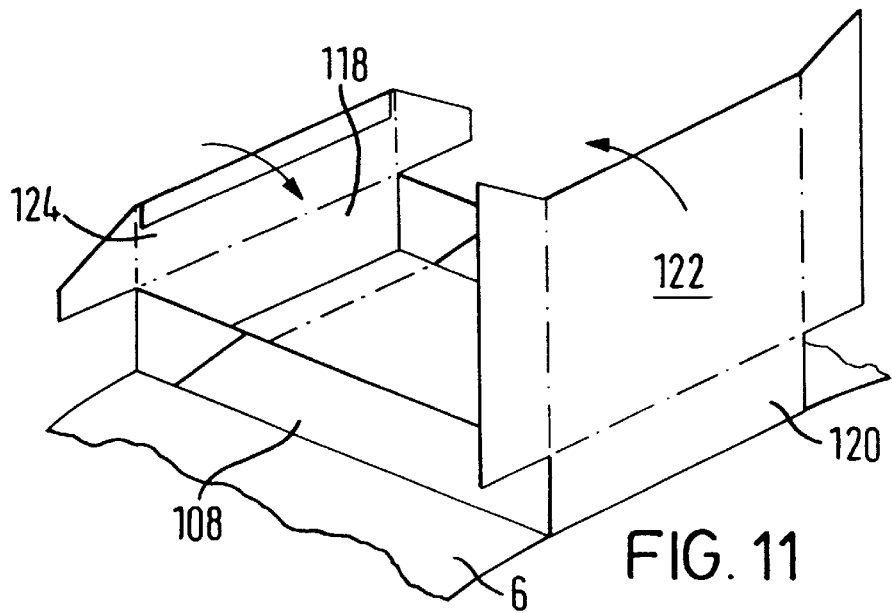
FIGS. 11 and 12 illustrate further successive stages in the folding of the blank of FIG. 6.
Figure 12:
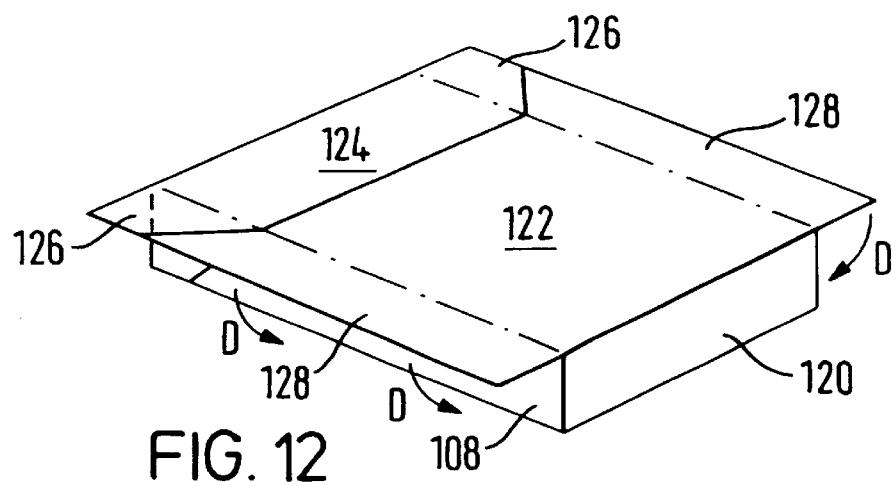
Figure 13:
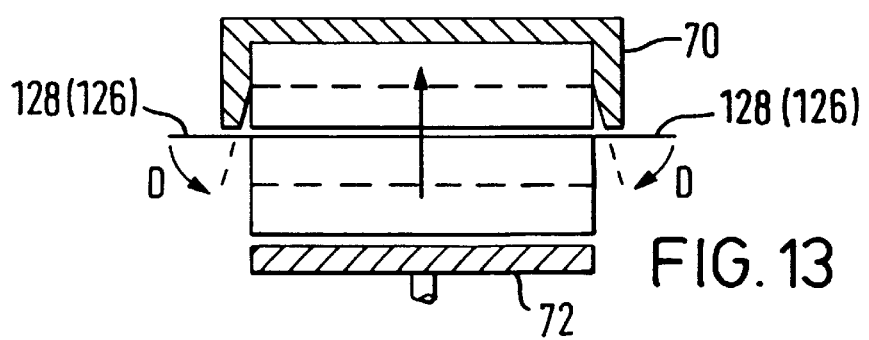
FIG. 13 illustrates a plunging operation which causes the flap folding of FIG. 12.

Subsequently, the two parts of the front of the pack, i.e. the front panel 122 and the lid front panel 124, are folded into position by means of suitable ploughs, as indicated in FIG. 11, the ploughs being arranged adjacent the opposite ends of the packet, and are so positioned that they engage the respective panels as the packet continues to rotate about the drum 6, from the forming position 54A and eventually fold these panels over onto the remaining part of the now almost-complete packet. The packet is now in the state indicated at station 3 in FIG. 2 and as shown in FIG. 12. Finally, as shown in FIG. 13, the outside flaps 126, 128 are folded downwardly in the direction of arrows D in FIGS. 12 and 13, by means of an upward plunging movement by a plunger 72 into another housing 70 at station 4 of FIG. 2. The housing 70 may be a pocket on exit conveyor 22.

What is claimed is:

1. Article wrapping apparatus in which a blank is formed around an article, comprising:

a plurality of process stations mounted on the periphery of a carrier drum, at least one of the plurality of process stations comprising a plurality of forming positions which are aligned and spaced in a direction parallel with an axis of said drum; and a holder which is pivotally mounted on said carrier drum, about a pivot axis extending transverse to the axis of said carrier drum, to enable an article to be transferred between said different axially aligned forming positions of said at least one process station;

a least one of the forming positions further comprising means for carrying out an operation to fold a blank around the article transfer of the article to or from the holder.

2. The apparatus as claimed in claim 1, wherein said operation is carried out during movement of the article into or out of the holder in a direction parallel to the pivot axis of the holder.

3. The apparatus as claimed in claim 1, wherein said mechanism folds said blank by co-operation with an edge of said holder.

4. Article wrapping apparatus in which a blank is formed around an article, comprising a transfer mechanism for articles which are to be processed at different positions on the periphery of a rotatable drum, such positions being aligned and spaced in a direction parallel with an axis of said drum, the transfer mechanisim comprising at least one holder which is pivotally mounted on an axis which extends radially of the drum, the holder being arranged to receive an article in a first position associated with a first processing station, and being pivotable about said axis to a second position which is associated with a second processing station and is displaced from said first position in a direction parallel with the drum axis.

5. Apparatus as claimed in claim 4, including a mechanism which delivers an article to or from said holder in a radial direction in at least one of said positions.

6. Apparatus as claimed in claim 4, wherein said holder has an opening which faces a direction parallel relative to said drum in at least one of said positions, including a mechanism which delivers an article through said opening substantially in said direction.

7. Apparatus as claimed in claim 4, including a further pivotally mounted holder having an opening which faces in a radial direction, and which is radially aligned with a corresponding opening in said holder in at least one of said positions, and a mechanism which transfers an article between said holder and said further holder in said position.

8. Apparatus as claimed in claim 7, wherein said further holder is pivotal about a radial axis relative to said drum whereby an article may be transferred between said position and a further position displaced in a direction parallel to said drum axis by pivotal movement of said further holder.

9. Article wrapping apparatus in which a blank is formed around an article, comprising a transfer mechanism for articles which are to be processed at different positions on the periphery of a rotatable drum, comprising at least one holder which is pivotally mounted on an axis which extends radially of the drum, the holder being arranged to receive an article in a first position, and being pivotable about said axis to a second, axially displaced position, including a further pivotally mounted holder having an opening which faces in a radial direction, and which is radially aligned with a corresponding opening in said holder in at least one of said positions, and a mechanism which transfers an article between said holder and said further holder in said position.

10. Apparatus as claimed in claim 9, wherein said further holder is pivotable about a radial axis relative to said drum whereby an article may be transferred between said position and a further axially displaced position by pivotal movement of said further holder.

* * * * *